United States Patent [19]

Kakeya

[11] Patent Number: 4,716,729

[45] Date of Patent: Jan. 5, 1988

[54] HYDRAULIC DRIVE SYSTEM FOR A COUNTERWEIGHT DOLLY IN COUNTERBALANCE TYPE CRANE

[75] Inventor: Mitsuo Kakeya, Hyogo, Japan

[73] Assignee: Kabushiki Kaisha Kobe Seiko Sho, Kobe, Japan

[21] Appl. No.: 928,032

[22] Filed: Nov. 7, 1986

[30] Foreign Application Priority Data

Jan. 27, 1986 [JP] Japan .................................. 61-15480
Jan. 27, 1986 [JP] Japan .................................. 61-15481

[51] Int. Cl.[4] ............................................ F16D 31/02

[52] U.S. Cl. ........................................ 60/426; 60/484; 60/493; 91/517; 212/196; 212/198

[58] Field of Search ......................... 60/426, 493, 484; 212/189, 196, 198; 91/461, 420, 517; 92/118

[56] References Cited

U.S. PATENT DOCUMENTS 3,679,179 7/1972 Praddaude ........................ 91/517 X
4,142,369 3/1979 Mickelson ......................... 91/420 X
4,241,803 12/1980 Lauber ............................ 212/189 X
4,341,149 7/1982 Dezelan ........................... 91/420 X
4,540,097 9/1985 Wadsworth et al. ............... 212/196

*Primary Examiner*—Edward K. Look
*Attorney, Agent, or Firm*—Oblon, Fisher, Spivak, McClelland, & Maier

[57] ABSTRACT

A hydraulic drive system for counterweight dolly in a counterbalance type crane, including dolly driving wheels supported vertically movably through wheel supporting hydraulic cylinders at the lower portion of the counterweight dolly which is connected to the rear portion of a crane body; a wheel driving hydraulic motor connected to each of the wheels; a support pressure detecting mechanism for detecting a support pressure for each wheel supporting hydraulic cylinder, the support pressure detecting mechanism being provided in a drive circuit for the cylinder; and a mechanism for controlling the driving pressure for the wheel driving hydraulic motor in accordance with a detected value provided from the detecting mechanism.

5 Claims, 6 Drawing Figures

HYDRAULIC DRIVE SYSTEM FOR A COUNTERWEIGHT DOLLY IN COUNTERBALANCE TYPE CRANE

BACKGROUND OF THE INVENTION

1. Field of the Invention

The present invention relates to a hydraulic drive system for a counterweight dolly in a counterbalance type crane.

2. Description of the Prior Art

Heretofore, as a large-sized travelling type crane there has been known a counterbalance type crane as described, for example, in U.S. Pat. No. 3,842,984 in which as shown in FIG. 5 a crane body is provided with a crawler 1, an upper swivelling structure 2, a main jib 3 and a mast 4, and a dolly 6 which carries a counterweight 5 thereon is connected through a connecting beam 7 to the crane body behind the upper swivelling structure 2, further the dolly 6 is connected to a guy line 8 suspended from an upper end of the mast 4 to thereby increase the lifting capacity and improve stability.

Practically applied is apparently a crane of this type in which wheels 9 disposed at the lower portion of the dolly 6 are provided with a drive unit for the travelling and swivelling of the counterweight dolly 6 following travelling of the crane body and swivelling of the upper swing member 2.

In this type of crane, as the lifting load increases, a large tension in a pulling-up direction for the dolly 6 acts on the guy line 8 which connects a fore end of the mast 4 and the dolly 6, and may result in lowering of the ground contact pressure of the wheels 9. In this case, the above conventional crane is not provided with means for detecting the ground contact pressure of the dolly wheels 9 and the driving force of a wheel driving motor, nor is it provided with means for adjusting those pressure and force. Consequently, even when the wheels 9 slip or skid with respect to the ground surface, the driving motor continues operation, resulting in a large quantity of energy being lost and the dolly 6 being prevented from travelling and swivelling smoothly. This is not only dangerous but there also is a fear of overload of a travelling drive system and of a swivelling drive system for the crane body. It is therefore necessary to either restrict the lifting capacity in a range capable of ensuring a ground contact pressure matching the driving force for the wheels 9, or make the counterweight heavier, resulting in the crane specification being limited. Thus various problems have plagued in conventional cranes.

SUMMARY OF THE INVENTION

According to the present invention, which has been accomplished for overcoming the above-mentioned conventional problems, there is provided a hydraulic drive system for a counterweight dolly capable of preventing wheels of the counterweight dolly from slipping and skidding to permit an efficient drive for the wheels, enhancing the effect of energy saving, improving stability to ensure safe travelling and swivelling, and further capable of increasing lifting capacity.

The present invention is basically characterized in that in a counterbalance type crane, dolly driving wheels are supported vertically movably through wheel supporting hydraulic cylinders, and wheel driving hydraulic motors are connected to the wheels, further a support pressure detecting means for detecting the support pressure of each said wheel supporting hydraulic cylinder is provided in a drive circuit for the same cylinder, and further provided is a control means which controls the driving pressure for each said wheel driving hydraulic motor on the basis of a detected value provided from the detecting means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
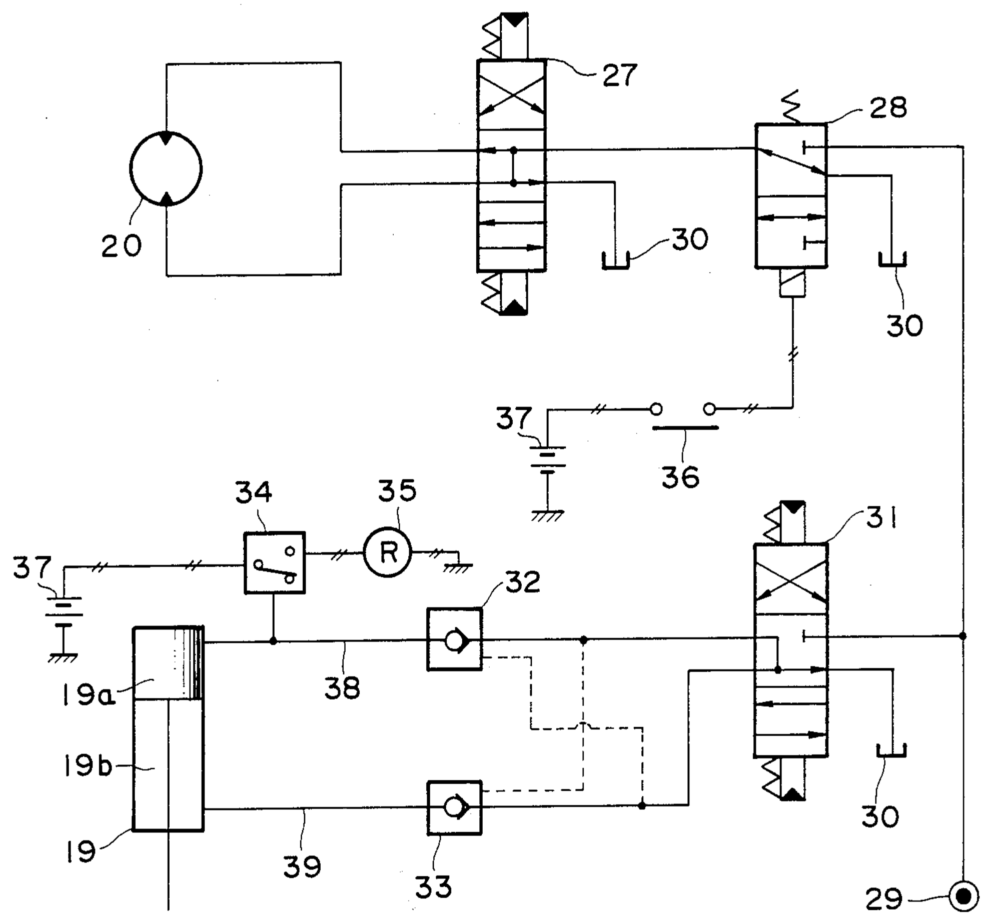
FIGS. 1 and 2 are hydraulic circuit diagrams showing first and second embodiments of the present invention.

The entire structure of a counterweight dolly according to the present invention will now be described with reference to FIGS. 3 to 6. At the lower portion of a dolly 10 are provided wheels 12 through wheel supports 11, etc. in four positions which are spaced at predetermined intervals in both longitudinal and transverse directions. Each wheel support 11 is rotatably supported by the dolly 10 about a vertical shaft through a swivel bearing 13. A suspension link 15 is supported at the lower portion of each wheel support 11 vertically pivotably through a horizontal pivot shaft 14. The wheels 12 are rotatably supported by the links 15 each through an axle 16, and a wheel supporting hydraulic cylinder 19 is connected between each link 15 and each wheel support 11 through connecting pins 17 and 18. A wheel driving hydraulic motor 20 is attached to the link 15, and each wheel 12 is connected to the hydraulic motor 20 through a transmission mechanism 21 such as a chain.

To the wheel support 11 is connected a steering link 22, which is connected through a connecting piece 24 to a steering hydraulic cylinder 23 attached to the dolly 10. Numeral 25 denotes a swivel joint, and numeral 26 denotes a counterweight carried on the dolly 10.

The present invention will be described below on the basis of hydraulic circuit diagrams each showing a drive system for the wheel driving hydraulic motor 20 and the wheel supporting hydraulic cylinder 19 in the counterweight dolly 10 of the above construction.

FIG. 1 illustrates an embodiment of the present invention characterized in that, as means for controlling the driving pressure for the above driving hydraulic motor, there is provided a switching means which cuts off the supply of hydraulic oil to the hydraulic motor driving circuit when a detected value provided from a detecting means which detects a support pressure of the wheel supporting hydraulic cylinder deviates from a preset range.

In FIG. 1, numerals 27, 28, 29, 30 and 31 denote a direction control valve for the hydraulic motor 20, a solenoid valve, a hydraulic oil source, a tank, and a direction control valve for the hydraulic cylinder 19, respectively. Further, numerals 32 and 33 each represent a pilot check valve, and numerals 34, 35, 36 and 37 denote a pressure switch (pressure detecting means), a relay, a relay switch, and a power source such as a battery, respectively. The solenoid valve 28 is disposed on an input side of the direction control valve 27 for the hydraulic motor and is operated through the pressure switch 34 provided in a pressure oil supply/discharge circuit 38 for a hydraulic chamber 19*a* which is provided on the support side (head side) of the hydraulic cylinder 19, as well as the relay 35 and the relay switch 36.

The following description is now provided about the operation.

Figure 3:
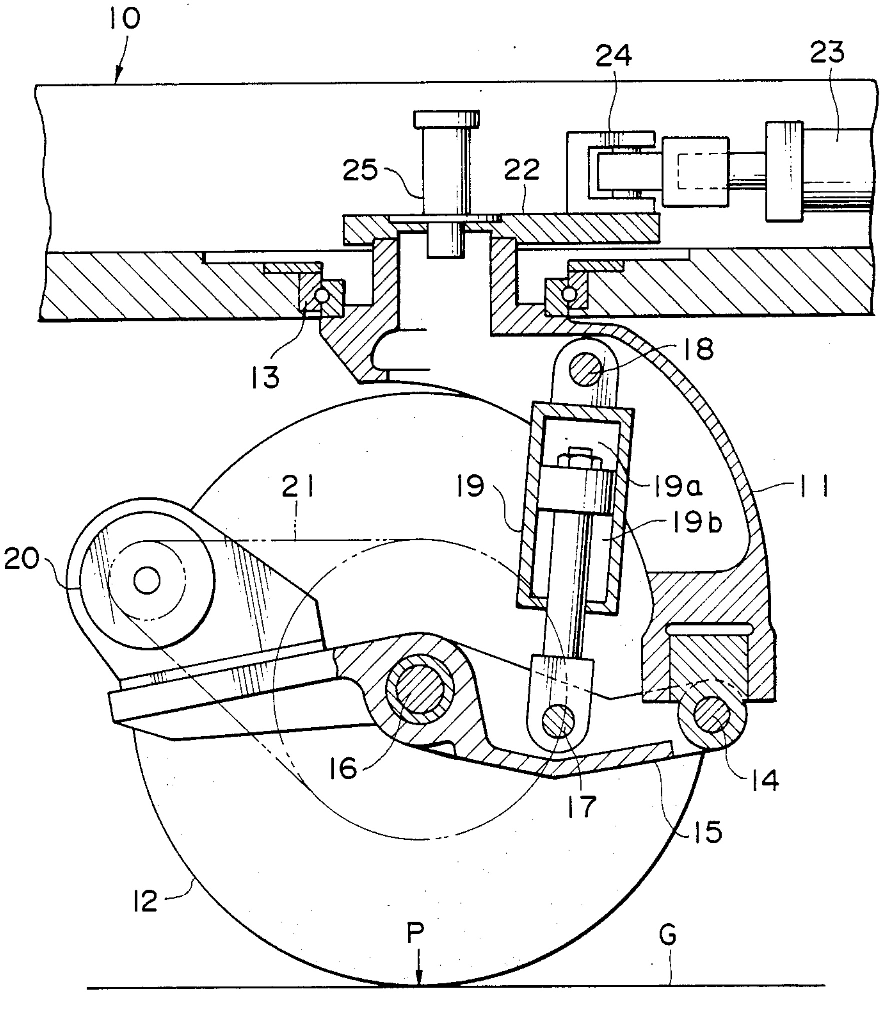
FIG. 3 is a sectional view of a principal portion showing a wheel supporting structure in a counterweight dolly.
Figure 4:
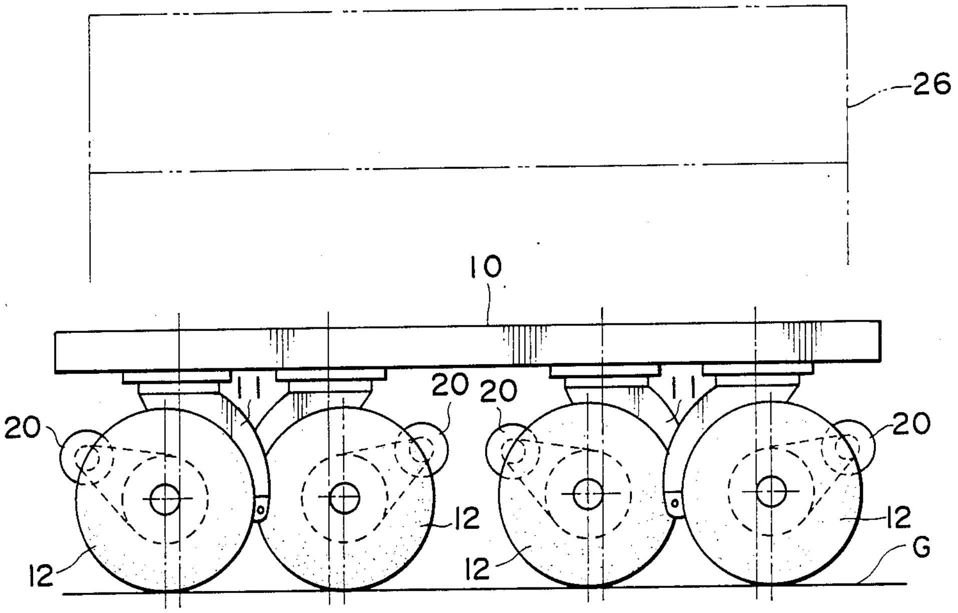
FIG. 4 is a front view of the counterweight dolly.
Figure 5:
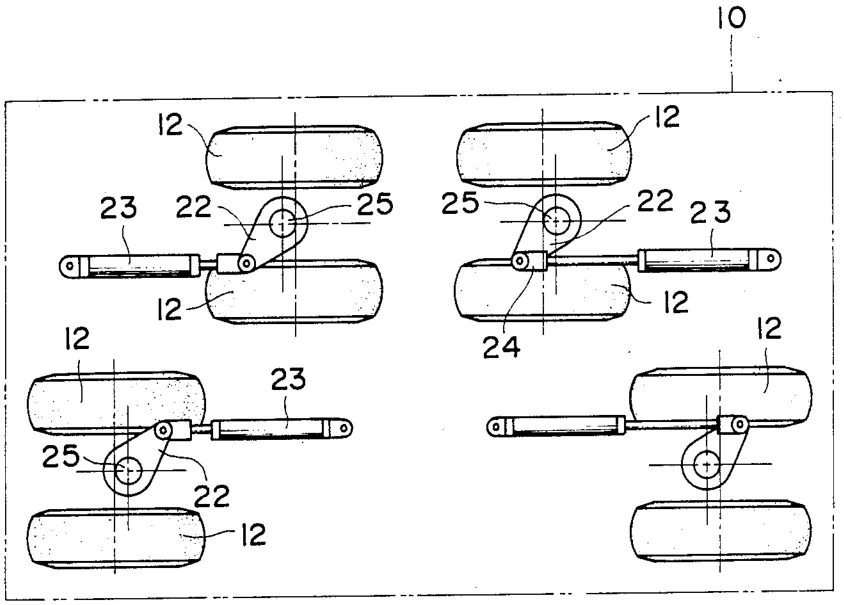
FIG. 5 is a schematic plan view thereof.
Figure 6:
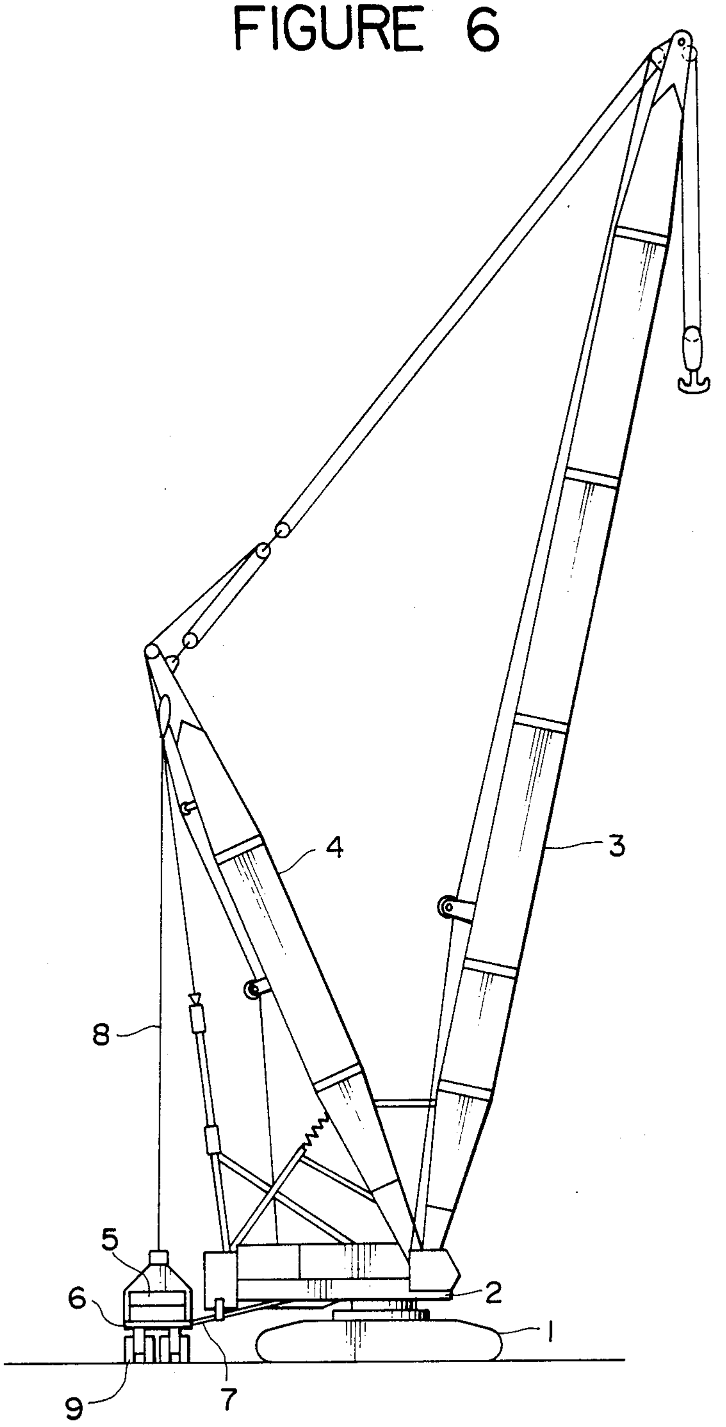
FIG. 6 is a side view of the counterbalance type crane.

The counterweight dolly 10 constructed as above is connected to the rear portion of an upper swivelling structure 2 of the crane body shown in FIG. 6 and also connected to a guy line 8, like the conventional dolly 6. In this case, at the time of connection to the guy line 8, the direction control valve 31 shown in FIG. 1 is changed over to its lower position, thereby allowing the hydraulic oil from the hydraulic oil source 29 to be supplied to the head-side hydraulic chamber 19*a* of the wheel supporting hydraulic cylinder 19 to extend the piston of the cylinder. As a result, the suspension link 15 shown in FIG. 3 is pivotally moved downward about the pivot shaft 14 and so the dolly 10 is pushed up, thus permitting easy connection of the dolly 10 with the guy line 8.

Thereafter, the direction control valve 31 is changed over to its upper position, thereby allowing the hydraulic oil from the hydraulic oil source 29 to be fed to a rod-side hydraulic chamber 19*b* of the hydraulic cylinder 19 to withdraw the piston of the cylinder. As a result, the link 15 is pivotally returned to its original position and the dolly 10 is held at a predetermined height so that a predetermined tension is exerted on the guy line 8. At this time a support pressure proportional to the weight of the counterweight 26 and a lifting load is developed in the support-side hydraulic chamber 19*a* of the wheel supporting hydraulic cylinder 19 in the dolly 10, and the wheel 12 is in contact with the ground G under a ground contact pressure P proportional to such support pressure. In a normal state of operation, the ground contact pressure P of the wheel 12 against the ground G, namely, the support pressure of the hydraulic cylinder 19, is higher than the pressure set for the pressure switch 34, so that the switch 34 is turned on and the solenoid valve 28 is changed over to its lower position by the action of the relay 35 and the relay switch 36, allowing the input port of the direction control valve 27 to communicate with the hydraulic oil source 29.

Next, for travelling of the crane, the steering hydraulic cylinders 23 for the wheels 12 of the dolly 10 are operated to steer the wheels 12 in a travelling direction, and in this state a crawler 1 of the crane body is driven and the direction control valve 27 in FIG. 1 is changed over to its upper or lower position. At this time, the pressure switch 34 is turned on and the solenoid valve 28 is changed over to its lower position. Therefore, upon change-over of the direction control valve 27, the hydraulic oil from the hydraulic oil source 29 is fed to the hydraulic motor 20 through the solenoid valve 28 and the direction control valve 27. In this manner the motors 20 are driven, which in turn drive the wheels 12, so that the counterweight dolly 10 travels integrally with the crane body.

For swivelling the upper swivelling structure 2, the steering hydraulic cylinders 23 are operated to steer the wheels 12 in a swivelling direction, and in this state the upper swivelling structure 2 of the crane body is driven for swivelling motion and the direction control valve 27 in FIG. 1 is changed over to its upper or lower position, whereby the hydraulic motors 20 are driven in the same manner as above, which in turn drive the wheels 12, so that the counterweight dolly 10 swivels integrally with the upper swivelling structure 2 of the crane body.

During the above travelling and swivelling motions, if the ground G is inclined or uneven, or if the weight of lifting load is too large, this condition may result in that the wheels 12 float from the ground G and the ground contact pressure P thereof becomes smaller, causing the wheels 12 to slip or skid. In this case, as the ground contact pressure P drops, the support pressure of the hydraulic cylinder 19 decreases as well, and when the support pressure becomes lower than the pressure set for the pressure switch 34, the switch 34 is turned off and the relay and relay switch 36 operate, whereby the solenoid valve 28 is returned to its position shown, so that the supply of the hydraulic oil from the hydraulic oil source 29 to the hydraulic motor 20 is stopped so as to turn off the motor. Consequently, the wheels 12 no longer skid in a slipping state, thus enhancing safety and having the effect of saving energy.

If the hydraulic circuit is constructed so that an alarm buzzer or a pilot lamp is operated the moment the solenoid valve 28 is changed over to its position shown by the actuation of the pressure switch 34, thereby advising the operator of a reduced ground contact pressure P of the wheels 12, the operator can stop operation upon issuance of such warning and adjust the ground contact pressure P of the wheels 12 to an appropriate value, for example by decreasing the crane load or making the counterweight heavier, thus permitting improvement in the safety of operation.

In the above embodiment, when the wheels 12 float completely from the ground G, the pressure of the rod-side hydraulic chamber 19*b* of the hydraulic cylinder 19 is increased by the weight of the wheels 12, etc. Therefore, a pressure switch may be provided in a circuit 39 connected to the rod-side hydraulic chamber 19*b* so that the wheel driving hydraulic motor 20 is turned off when this pressure switch is turned off.

Although in the above embodiment the solenoid valve 28 is actuated electrically using the pressure switch 34, a pilot type change-over valve may be used and actuated by a support pressure taken out from the circuit 38 or 39 of the hydraulic cylinder 19.

Figure 2:
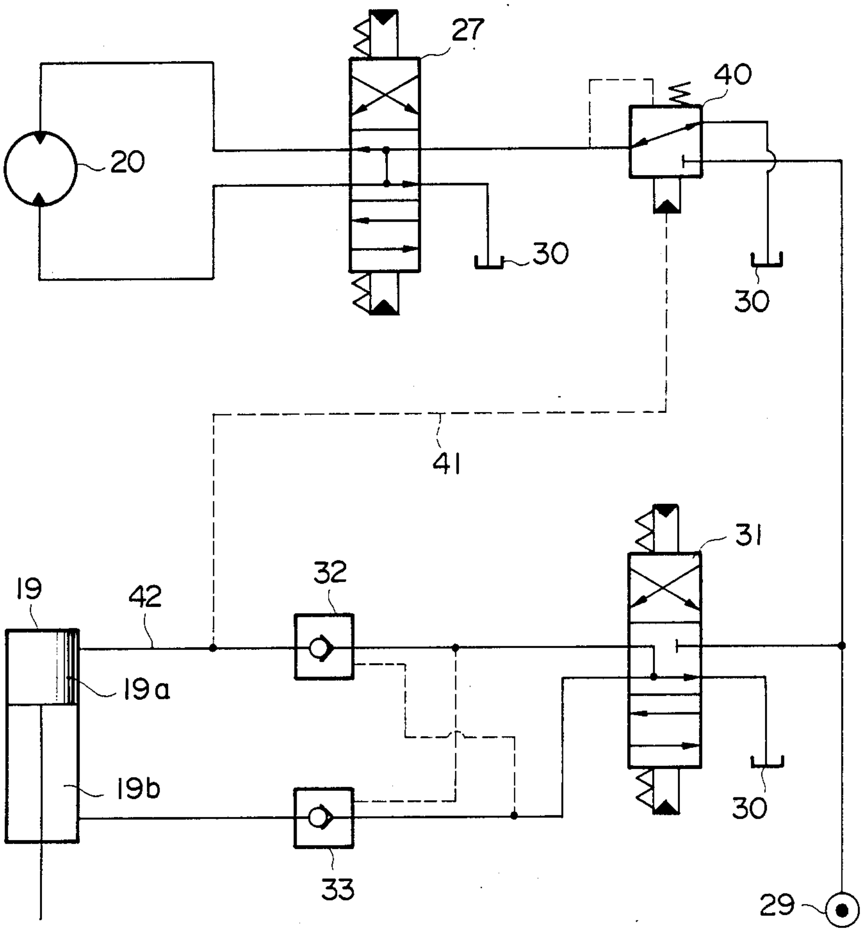

FIG. 2 illustrates another embodiment of the present invention characterized in that as means for controlling the driving pressure for the above driving hydraulic motor there is provided a pressure control means which controls the driving pressure for the hydraulic motor in proportion to a detected value provided from a detecting means for detecting a support pressure of the above wheel supporting hydraulic cylinder.

In FIG. 2, the same components as in FIG. 1 are indicated by the same reference numerals. In the embodiment illustrated therein, a pressure control valve 40 is adopted in place of the solenoid valve 28 shown in FIG. 1 and is actuated by a pressure signal taken out through a pilot line 41 (detecting means) from a hydraulic oil supply-discharge circuit 42 for the support-side (head-side) hydraulic chamber 19*a* of the hydraulic cylinder 19.

The following is an explanation of the operation.

The counterweight dolly 10 constructed as above is connected to the rear portion of the upper swivelling structure 2 of the crane body shown in FIG. 6 and also connected to the guy line 8, like the conventional dolly 6. In this case, at the time of connection to the guy line 8 a direction control valve 31 shown in FIG. 2 is changed over to its lower position, thereby allowing the hydraulic oil from the hydraulic oil source 29 to be supplied to the head-side hydraulic chamber 19*a* of the wheel supporting hydraulic cylinder 19 to extend the piston of the cylinder. As a result, the suspension link 15 shown in FIG. 3 is pivotally moved downward about the pivot shaft 14 and so the dolly 10 is pushed up, thus permitting easy connection of the dolly 10 with the guy line 8.

Thereafter, the direction control valve 31 is changed over to its upper position, thereby allowing the hydraulic oil from the hydraulic oil source 29 to be fed to the rod-side hydraulic chamber 19*b* of the hydraulic cylinder 19 to withdraw the piston of the cylinder. As a result, the link 15 is pivotally returned to its original position and the dolly 10 is held at a predetermined height so that a predetermined tension is exerted on the guy line 8. At this time, the wheels on the dolly 10 are in contact with the ground G at a ground contact pressure P.

Next, for travelling of the crane, the steering hydraulic clyinders 23 for the wheels 12 of the dolly 10 are operated to steer the wheels in a travelling direction, and in this state the crawler 1 of the crane body is driven. At the same time the direction control valve 27 in FIG. 1 is changed over to its upper or lower position and the hydraulic motors 20 are driven to drive the wheels 12, so that the counterweight dolly 10 travels integrally with the crane body.

For swivelling the upper swivelling structure 2, the steering hydraulic cylinders 23 are operated to steer the wheels 12 in a swivelling direction, and in this state the upper swivelling structure 2 of the crane body is driven for swivelling motion and the direction control valve 27 in FIG. 1 is changed over to its upper or lower position, whereby the hydraulic motors 20 are driven, which in turn drive the wheels 12, so that the counterweight dolly 10 swivels integrally with the upper swivelling structure 2 of the crane body.

During the above travelling and swivelling motions, a support pressure proportional to the weight of the counterweight 26 and a lifting load is developed in the support-side hydraulic chamber 19*a* of the wheel supporting hydraulic cylinder 19 in the dolly 10, and the wheels 12 are in contact with the ground G under a ground contact pressure P proportional to such support pressure. But if the ground G is inclined or uneven, the ground contacts pressure P of the wheels 12 will vary.

On the other hand, the pressure of the support-side hydraulic chamber 19*a* of the hydraulic cylinder 19 is conducted to the pressure control valve 40 through the pilot line 41. By this pilot pressure the pressure control valve 40 is operated to control the driving pressure to be supplied from the hydraulic oil source 29 to the hydraulic cylinder 20 through the pressure control valve 40 and the direction control valve 27. The higher the ground contact pressure P, i.e. the support pressure of the hydraulic cylinder 20, the higher becomes a secondary pressure of the pressure control valve 40 and the driving pressure for the hydraulic motor 20, so that the wheels 12 are driven by a larger driving force. Conversely, as the ground contact pressure P decreases, the secondary pressure of the pressure control valve 40 drops and so does the driving pressure for the hydraulic motor 20, so that the wheels 12 are driven by a small driving force.

In this way the driving force for the wheels 12 of the dolly 10 is controlled in proportion to the ground contact pressure of the wheels to prevent slipping and skidding of the wheels against the ground G and ensure efficient driving and smooth travelling and swivelling of the dolly 10 integral with the crane body. Thus, the dolly can travel and swivel safely without impairing the stability of the entire crane.

Obviously, numerous modifications and variations of the present invention are possible in light of the above teachings. It is therefore to be understood that within the scope of the appended claims, the invention may be practiced otherwise than as specifically described herein.

What is claimed is:

1. A hydraulic drive system for a counterweight dolly in a counterbalance type crane, including:

dolly driving wheels vertically movably supported through wheel supporting hydraulic cylinders at the lower portion of the counterweight dolly which is connected to the rear portion of a crane body;

a wheel driving hydraulic motor connected to each of said wheels;

support pressure detecting means for detecting a support pressure of each of said wheel supporting hydraulic cylinders, said support pressure detecting means being provided in a drive circuit for the cylinders; and means for controlling the driving pressure for said wheel driving hydraulic motor in accordance with a detected value generated from said detecting means.

2. A hydraulic drive system according to claim 1, wherein said driving pressure control means comprises change-over means for cutting off the supply of hydraulic oil to said drive circuit for said hydraulic motor when said detected value deviates from a predetermined range.

3. A hydraulic drive system according to claim 1, wherein said driving pressure control means comprises a pressure control means for controlling the driving pressure for said hydraulic motor in proportion to said detected value.

4. A hydraulic drive system according to claim 2, wherein a solenoid valve is provided on an input side of a direction control valve for the wheel driving hydraulic motor, and further comprising a pressure switch, a relay and a relay switch for actuating said solenoid valve, and a hydraulic oil supply/discharge circuit for a support-side hydraulic chamber of each of said wheel supporting hydraulic cylinders, said pressure switch being provided in said hydraulic oil supply/discharge circuit.

5. A hydraulic drive system according to claim 3, further comprising a pressure control valve provided on an input side of a direction control valve for said wheel driving hydraulic motor, said pressure control valve being actuated by a pressure signal taken out through a pilot line from a hydraulic oil supply/discharge circuit for a support-side hydraulic chamber of each of said wheel supporting hydraulic cylinders.

* * * * *